Patented July 27, 1937

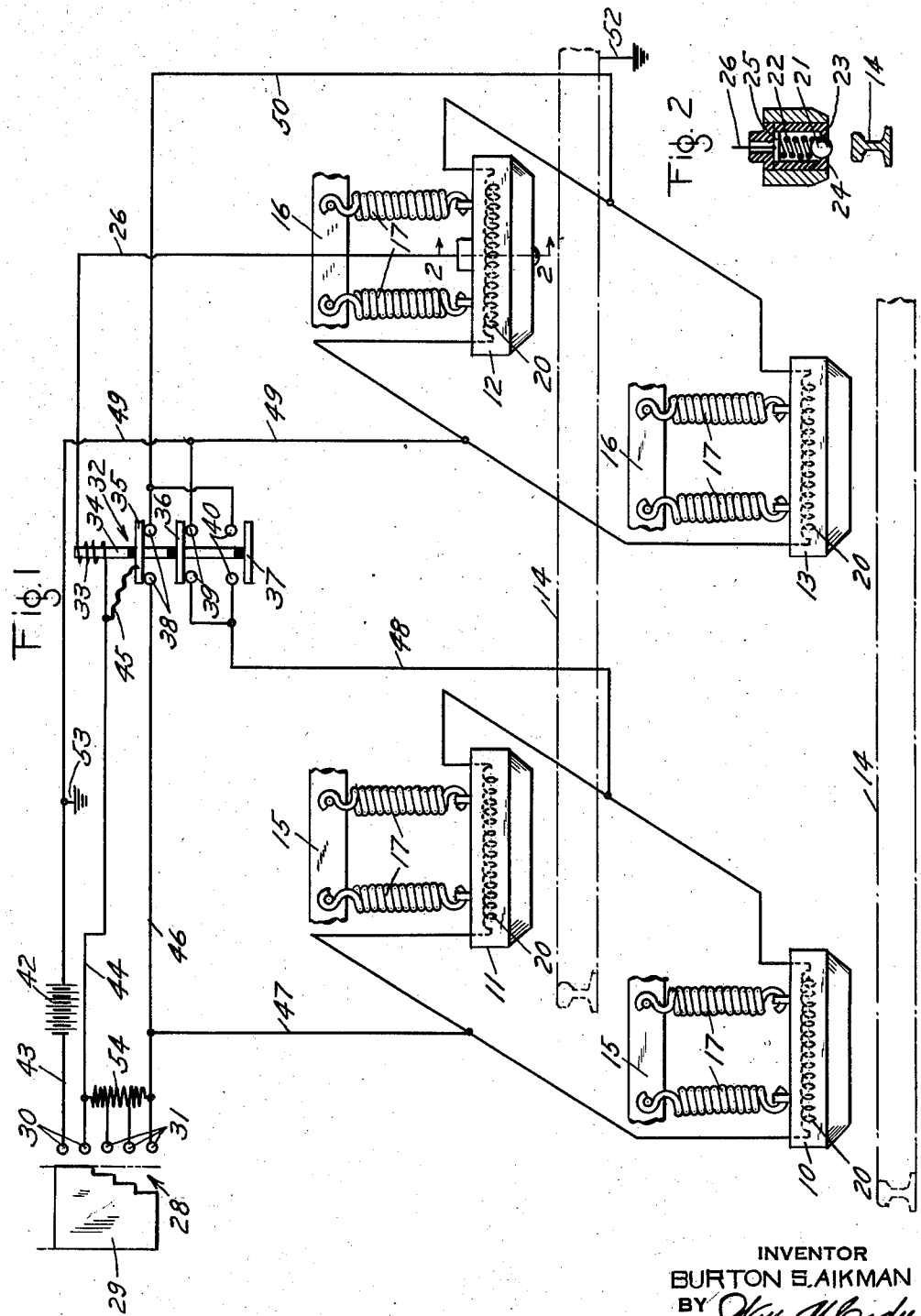

2,088,273

UNITED STATES PATENT OFFICE 2,088,273

MAGNETIC TRACK BRAKE

Burton S. Aikman, Wilkinsburg, Pa., assignor to The Westinghouse Air Brake Company, Wilmerding, Pa., a corporation of Pennsylvania Application October 14, 1936, Serial No. 105,469

11 Claims. (Cl. 188—165)

This invention relates to magnetic track brakes, and more particularly to magnetic track brakes for railway trains and traction vehicles.

A desirable manner in which to suspend a magnetic track brake device from a vehicle truck is to suspend it on springs. This results in a simple construction relatively free from disorder and requiring only the simplest of maintenance. However, when this type of suspension is employed, in order to have the magnetic track brake devices drawn to engagement with the track rails by virtue of their own magnetism, the track brake devices must be energized to a relatively high degree. This is particularly so when the distance between the rail-engaging shoes of the track brake devices and the rail increases above the desired normal distance, due to wear of the shoes.

Because of the fact that a high degree of energization is required to cause the track brake devices to be attracted to the rail, the braking effect which results when the track brake devices engage the rails is often times much higher than desired, giving rise in some instances to shocks which produce discomfort to passengers. In order to overcome this difficulty, it is desirable that at the time the track brake devices engage the rail the degree of energization of the devices be reduced, so that the resulting braking effect will be a minimum, or at least only a moderate value.

A principal object of the present invention is to provide a magnetic track brake system in which upon engagement of the magnetic track brake devices with the track rails the energization of the track brake devices is automatically reduced so as to reduce the possible braking effect.

A more specific object of the invention is to provide in a magnetic track brake system a mechanism which operates responsive to the close approach of at least one magnetic track brake device toward a track rail to so alter the energization of all of the track brake devices in the brake system as to result in a smooth initial application of the brakes.

Other and more specific objects of the invention will be apparent from the following description, which is taken in connection with the attached drawing, wherein Fig. 1 shows in schematic and diagrammatic form an embodiment of the invention, Fig. 2 shows in diagrammatic form a sectional view of the switch mechanism in one of the track brake devices, taken along the line 2—2 of Fig. 1.

Referring now to the drawing, I have shown four magnetic track brake devices 10, 11, 12 and 13. With the exception of the track brake device 12, these may be of conventional design, and preferably of the type employing two parallel disposed rail-engaging shoes, which extends longitudinally of the track rail. The track rails over which the track shoes are suspended are indicated by the broken lines 14.

The track brake devices are preferably suspended from vehicle trucks 15 and 16 by means of springs 17. It is to be understood that the fragmentary structural portions 15 and 16 represent two separate trucks, and that the track brake devices 10 and 11 are suspended from the truck 15, while the track brake devices 12 and 13 are suspended from the truck 16.

Each track brake device preferably has a single energizing winding 20, which may be energized to different degrees to effect different degrees of braking between the associated track brake device and the track rail.

The track brake device 12 has embodied therein a switch mechanism comprising a contact 21, in the form of a ball, urged downwardly of the track brake device by a spring 22, the spring and contact being insulated from the track brake device casing by, and housed in, an insulating bushing 23. A flange 24 prevents the contact ball 21 from being urged clear of the bushing. At the top of the spring 22 is a contact plate 25, which has attached thereto a conductor 26. As will be obvious, when the track brake device 12 moves toward the rail 14 the contact 21 will engage the rail ahead of the rail-engaging shoes of the brake device, so as to form electrical connection between conductor 26 and the track rail.

For controlling the degree of current supplied to the windings 20 of the several track brake devices, I have shown in diagrammatic form a controller 28, which is preferably of the drum type. This controller comprises a stepped contact plate or drum 29, which is adapted when moved to the right to first engage and bridge two stationary contact fingers 30, and thereafter to sequentially engage other stationary contact fingers 31.

Also forming a part of the control system is a relay 32 having a winding 33 and an armature member 34. The armature member carries insulated therefrom, and from each other, three contact members 35, 36 and 37, adapted to engage, respectively, stationary contacts 38, 39 and 40.

Further understanding of my invention will be best realized from a discussion of the operation of the embodiment thus far described.

When the controller 28 is in the release position, as illustrated, the windings of the several track brake devices will be deenergized, and the suspension springs 17 will hold the track brake devices in their raised or release position above the track rail, as indicated.

Assuming now that the controller 28 is moved to its first application position, where the contact drum 29 engages only the two contacts 30, a circuit will be established from a suitable source of current supply, here indicated for the sake of illustration as a battery 42, to the windings of the track brake devices as follows. A first circuit will be established to the windings of the track brake devices 10 and 11, from the battery 42, including conductors 43, stationary contacts 30 and drum 29, conductors 44 and 45, contact 35 and the left hand contact 38 of relay 32, conductors 46 and 47, and the parallel combination of the windings in the two track brake devices 10 and 11, the return circuit to the battery 42 being by way of conductor 48, contacts 36 and 39 of relay 32, and conductor 49.

A second circuit will be established to the windings 20 of the two track brake devices 12 and 13 over the same path just described up to and including the contact 35 of relay 32, from whence it includes the right hand contact 38, conductor 50, and the parallel combination of the windings of the two track brake devices 12 and 13, the return circuit to the battery being by way of the aforementioned conductor 49.

It will be seen that all of the track brake device windings will be energized directly from the battery 42 with no resistance in series therewith, maximum energization thus resulting. The track brake devices will therefore be promptly attracted toward the track rails 14.

When the track brake device 12 is only a short distance above the track rail 14, the ball contact 21 will engage the top surface of the track rail and complete a circuit from the battery 42 through the relay winding 33 as follows. From battery 42 the circuit includes conductor 43, stationary contacts 30 and drum 29 of the controller 28, conductor 44, winding 33, conductor 26, contact plate 25, spring 22, ball contact 21, and rail 14. The rail 14 is grounded as indicated at 52, and since the battery 42 is grounded at 53, a complete circuit is formed, and the winding 33 will be energized.

Upon energization of the winding 33 the armature member 34 is moved upwardly. The relatively stationary contacts 38, 39 and 40, while shown diagrammatically, are to be understood to be resilient contacts, so constructed and arranged that when the member 34 moves upwardly the following sequence of operations takes place: first, contact 36 disengages from contacts 39, then contact 37 engages contacts 40, and finally contact 35 disengages from contacts 38. The relay is preferably of the fast-acting type, so that this sequence will occur rapidly and thus not delay positive movement of the brake devices to the track rails.

Upon the above operation of the relay 32, all of the resistance 54, the parallel group of windings in the brake devices 10 and 11, and the parallel group of windings in the brake devices 11 and 12, are connected in series, as will be clear from the circuit arrangement shown in Fig. 1. This will, of course, reduce the degree of energization of the windings 20, but it is intended that at the time the ball contact 21 engages the rail 14, the track brake devices will be close enough to the track rails so that the reduced degree of energization will be sufficient to pull the track brake devices to engagement with the track rails and hold them there. The reduced degree of energization will also produce a minimum braking effect, so that there will not be produced undesirable shocks.

If the controller 28 is now moved to its second or third position, the result is to cut out portions of the resistance 54 and thus increase the degree of energization of the several track brake windings. If the controller is moved to its last position all of the resistance 54 will be cut out.

If for any reason the relay 32 should fail during an application of the brakes, the armature 34 would drop and thereby cause the track brake devices to be energized to a maximum degree if the controller 28 is in other than its last application position. The arrangement thus incorporates a safety principle, namely, upon failure of one of the essential parts the failure operates in a direction to increase the degree of application of the brakes, rather than in the direction of releasing the track brakes.

I have illustrated one track brake device only as being provided with a contact 21, but it is to be understood that any desired number of the brake devices may be provided with such a contact, and all connected in parallel so that the first to engage a track rail (both of which are usually grounded in standard railway systems) will energize the relay 32.

While I have described my invention with particular reference to one embodiment thereof, it will be apparent to those skilled in the art that modifications may be made and I do not wish to be limited other than by the spirit and scope of the appended claims.

Having now described my invention, what I claim as new and desire to secure by Letters Patent, is:

1. In a magnetic track brake system, in combination, a magnetic track brake device, means for energizing said magnetic track brake device to a high degree to cause it to be attracted toward a track rail, an electrical contact carried by said magnetic track brake device adapted to engage said track rail ahead of engagement by said track brake device, and means responsive to engagement of said contact with said rail for decreasing the energization of said track brake device.

2. In a magnetic track brake system, in combination, a magnetic track brake device, spring means for suspending said track brake device suspended above a track rail, means for supplying a high degree of current to said track brake device to cause attraction thereof toward said track rail, and means including an electrical contact on said track brake device adapted to engage the track rail ahead of said track brake device for diminishing the degree of current supplied to said track brake device.

3. In a magnetic track brake system, in combination, a magnetic track brake device adapted to engage a track rail, means operative upon effecting an application of the brakes for establishing a circuit direct to said track brake device from a suitable source of current supply, an electrical contact carried by said track brake device for engaging said track rail ahead of engagement by said track brake device, and means responsive to engagement of said contact with said rail for causing resistance to be included in circuit with said track brake device.

4. In a magnetic track brake system, in combination, a magnetic track brake device having an energizing winding, spring means for suspending said track brake device suspended above a track rail, means for supplying current to said winding to a desired degree to cause movement of said track brake device toward the rail, an electrical contact carried by said track brake device adapted to engage said rail ahead of said track brake device, and electroresponsive means operative upon engagement of said track brake device with said rail for reducing the degree of current supplied to said winding.

5. In a magnetic track brake system, in combination, a relay operative in a deenergized position to establish a current supply circuit exclusive of resistance and operative in an energized position to establish a different supply circuit inclusive of resistance, a magnetic track brake device having an energizing winding, means operative to supply current to said track brake device winding through said first mentioned circuit, an electrical contact carried by said track brake device and adapted to engage a track rail upon movement of said brake device toward the rail, and means responsive to engagement of said contact with said rail for energizing said relay to open said first mentioned circuit and to connect said track brake device to said second mentioned circuit.

6. In a magnetic track brake system, in combination, a magnetic track brake device having an energizing winding, spring means for suspending said magnetic track brake device above a track rail, a brake controller operative in a first application position to supply current to said winding through a resistance, and operative in other application positions to cut out portions or all of said resistance, a relay operative in its deenergized position to establish a circuit to said track brake device winding exclusive of said resistance, and operative in an energized position to establish a circuit to said winding inclusive of said resistance, and electrical contact means carried by said track brake device and operative upon engagement of said contact means with said track rail for energizing said relay.

7. In a magnetic track brake system, in combination, a plurality of magnetic track brake devices, means for connecting said magnetic track brake devices so as to be energized in groups, a controller device including a resistance and operative to supply current to said groups through said resistance, an electrical contact carried by at least one of said track brake devices and operative to engage the track rail ahead of engagement by said track brake device, and means operative before engagement of said contact with said rail for excluding said resistance from in circuit with said track brake devices and operative upon engagement of said contact with said rail for including said resistance in circuit with said track brake devices.

8. In a magnetic track brake system, in combination, a plurality of track brake devices normally suspended above a track rail and having windings which upon energization thereof cause said track brake devices to be attracted toward engagement with said track rail, a controller device including a resistance and operative to supply current to said track brake devices through said resistance, a relay operative in its deenergized position to establish a circuit from said controller device to said track brake devices exclusive of said resistance and operative in its energized position to establish a circuit from said controller device to said track brake devices inclusive of said resistance, and an electrical contact carried by at least one of said track brake devices and adapted to engage a track rail slightly ahead of engagement by the associated track brake device to energize said relay.

9. In a magnetic track brake system, in combination, a plurality of magnetic track brake devices each of which has an energizing winding, means for connecting said windings in a plurality of parallel groups and for energizing said group in parallel when effecting an application of the track brakes, an element carried by one of said brake devices and so arranged as to engage a track rail before engagement by said brake device, and means responsive to engagement of said element with the rail for connecting all of said winding groups in series.

10. In a magnetic track brake system, in combination, a plurality of magnetic track brake devices each of which has an energizing winding, means for connecting said windings in a plurality of parallel groups and for energizing said groups in parallel when effecting an application of the track brakes, a resistance, a contact carried by one of said brake devices and so arranged as to engage a track rail ahead of engagement by said brake device, and means operative upon engagement of said contact with the rail for connecting said resistance and said groups of windings in a series relationship.

11. In a magnetic track brake system, in combination, a plurality of magnetic track brake devices, means for energizing each of said brake devices to a relatively high degree to cause each device to be attracted toward a track rail, an electrical contact carried by at least one of said brake devices and adapted to engage said track rail prior to engagement by said brake device, and means responsive to engagement of said contact with said rail for decreasing the degree of energization of all of said brake devices.

BURTON S. AIKMAN.